(12) United States Patent
Larsson

(10) Patent No.: US 7,822,015 B2
(45) Date of Patent: *Oct. 26, 2010

(54) METHOD OF OPERATING SYSTEMS COMPRISING COMMUNICATION SERVICES

(75) Inventor: Conny Larsson, Stallarholmen (SE)

(73) Assignee: Teligent AB, Nynäshamn (SE)

( * ) Notice: Subject to any disclaimer, the term of this patent is extended or adjusted under 35 U.S.C. 154(b) by 1111 days.

This patent is subject to a terminal disclaimer.

(21) Appl. No.: 10/589,224

(22) PCT Filed: Feb. 10, 2005

(86) PCT No.: PCT/SE2005/000171

§ 371 (c)(1),
(2), (4) Date: Aug. 11, 2006

(87) PCT Pub. No.: WO2005/079047

PCT Pub. Date: Aug. 25, 2005

(65) Prior Publication Data

US 2007/0171934 A1 Jul. 26, 2007

(30) Foreign Application Priority Data

Feb. 11, 2004 (SE) .................................. 0400292

(51) Int. Cl.
*H04L 12/66* (2006.01)
(52) U.S. Cl. .................. 370/352; 379/201.02
(58) Field of Classification Search ......... 370/352–357, 370/466, 389; 379/90.01, 93.01, 201.02–5, 379/207.01–15

See application file for complete search history.

(56) References Cited

U.S. PATENT DOCUMENTS

| | | | | |
|---|---|---|---|---|
| 6,252,869 B1 | * | 6/2001 | Silverman | 370/352 |
| 6,574,322 B1 | | 6/2003 | Larsson | 379/207.02 |
| 6,968,367 B1 | * | 11/2005 | Vassar et al. | 709/219 |
| 6,996,094 B2 | * | 2/2006 | Cave et al. | 370/356 |

FOREIGN PATENT DOCUMENTS

| | | |
|---|---|---|
| EP | 0 928 548 | 7/1999 |
| WO | WO 98/16071 | 4/1998 |

* cited by examiner

*Primary Examiner*—Suhan Ni
(74) *Attorney, Agent, or Firm*—Alfred J. Mangels

(57) ABSTRACT

A method of operatively handling data systems that include communications services, particularly telephone and data services. A computer system executes a service in accordance with a data program and also processes log data. The computer system includes databases, at least one containing a predetermined number of transactions in the form of parts of a data program. The computer fetches from a database transactions that together form a data program for executing a service or a processing function. An interface is provided between an administrative part of the system and an all-embracing part, and an interface is also provided between an operating part of the system and the all-embracing part, wherein the interfaces are mutually the same. The all-embracing part has an executing environment such that execution therein and instructions therefrom to other parts of the system take place through the agency of the transaction.

6 Claims, 1 Drawing Sheet

METHOD OF OPERATING SYSTEMS COMPRISING COMMUNICATION SERVICES

BACKGROUND OF THE INVENTION

1. Field of the Invention

The present invention relates to a method of handling or administering systems that include communications services. The invention relates particularly to telecommunications services that include both data and speech transmission.

2. Description of the Related Art

A problem with such present-day systems that include communications services, and particularly telecommunications, is that resources handled by the operating system (for example, UNIX or Windows), such as memories, diskette accommodating spaces, log files, etc., and internal networks and also databases/access methods, are handled operatively with programs such as utilities, tools, procedures, etc. Such programs only take into account, for instance, the requirement of the database handler for consistent behavior and do not take into account "users" such as communications services. Particularly in the case where an all-embracing system that executes by means of so-called transactions handles the services completely, the requirement of a system that handles both operating/administrative processes together with service requirements is extremely large.

Known solutions are most often implemented as a loose combined conglomeration of programs, UNIX scripts, or the like, often manually, in order to obtain a correct function. For example, a database backup requires the service to have access to a temporary copy of the database in order to be able to continue execution, or the service is stopped. In the majority of such operating processes, it is necessary to administer two mutually different processes in the absence of any support or simultaneous control by any of the parties concerned.

The present invention solves that problem.

SUMMARY OF THE INVENTION

The present invention thus relates to a method of operatively handling data systems that include communications services, particularly telephone and data services. A computer system is adapted to execute a service in accordance with a data program, and is also adapted to process log data. The computer system includes databases, of which at least one database contains a predetermined number of transactions in which each transaction has the form of parts of a data program. The computer/system fetches one or more transactions from the database or databases, the transactions together forming a data program for executing the service or the processing function. The system includes an interface between an administrative part of the data system and an all-embracing part of the data system, and also an interface between an operative part of the data system and the all-embracing part of the data system, wherein the interfaces are mutually the same. The all-embracing part has an executing environment such that execution in the all-embracing system and instructions from the all-embracing system to other parts of the data system takes place through the agency of the transaction.

BRIEF DESCRIPTION OF THE DRAWING

The invention will now be described in more detail with reference to the accompanying drawing, which illustrates an exemplifying embodiment of the invention and in which.

DESCRIPTION OF THE PREFERRED EMBODIMENTS

Figure 1:
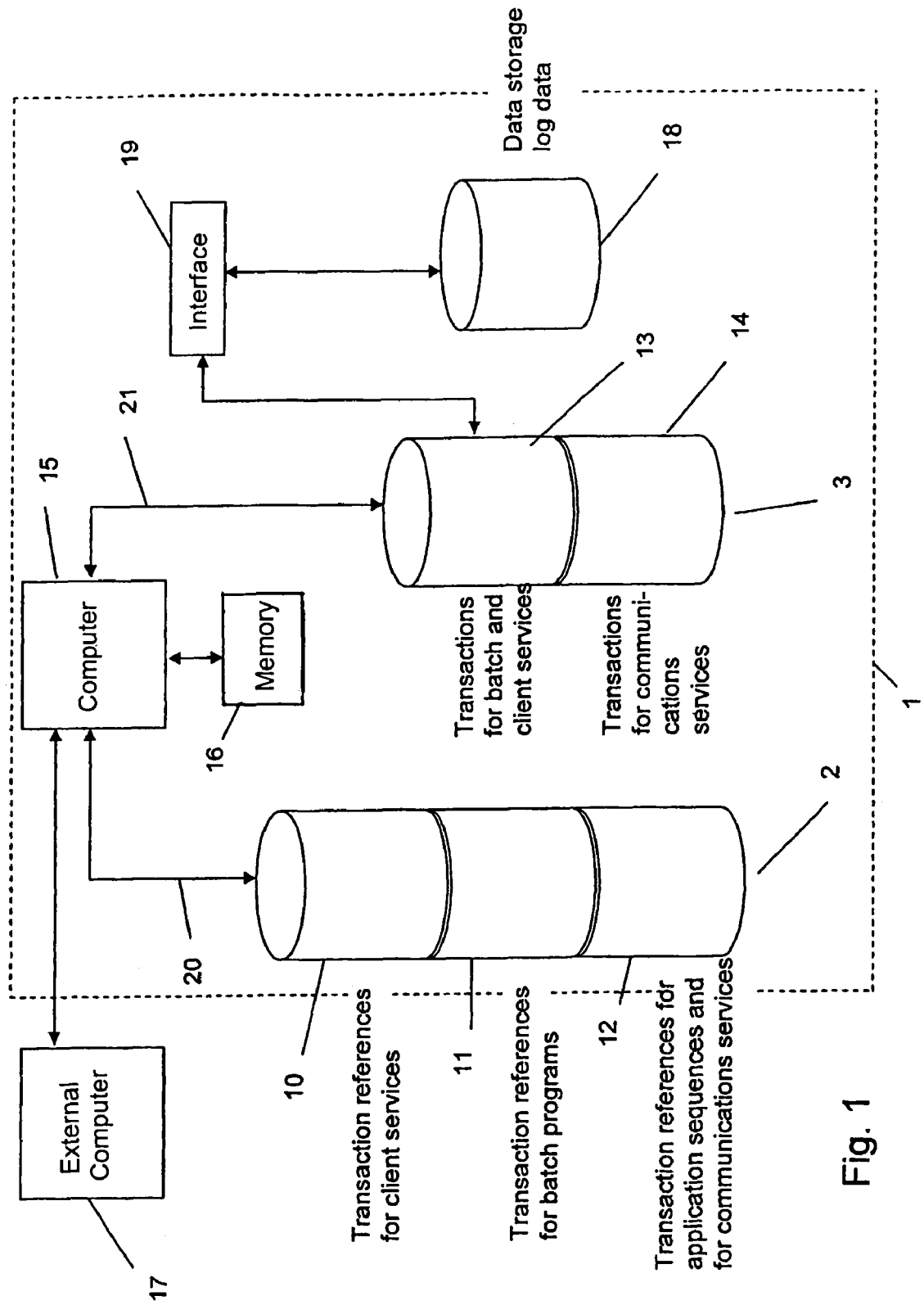
FIG. 1 is a block diagram showing the data system.

There is described in the following description a system that includes communications services, particularly telephone communication, where the system can be supplemented to provide a more complete solution from the aspect of operative and administrative processes.

There is particularly described the case where the all-embracing system operates in accordance with European Patent Specification No. 0 928 548, where execution is effected by summoning a number of transactions from a database that includes the transactions.

In the case of the solution described in the following text, the interface possessed by the administrative and operative functions is abstracted and can thereby be represented in a manner similar to those functions included by the communications services in the all-embracing system, as in the European patent specification. That abstraction will, of course, include also the resources, such as files, databases, memories, etc., as those on which the functions operate, regardless of whether functions relating to the behavior of the services is concerned, or the operative administration of those functions.

This approach enables the all-embracing system to be programmed for operative work in harmony with service representation. In other words operative processes can be programmed in accordance with the transaction method described in the above-identified patent specification, or in accordance with some other transaction method that is implemented by another all-embracing system.

With this method, there is included (abstracted) selective processes or methods from operating systems, database handlers, or the like in the all-embracing system, and procedures or measures can thus be verified and synchronized in a unique place in the system.

The advantages afforded with this solution as compared with the earlier standpoint of techniques are obvious.

One advantage is that modifications in service execution are made in the same system as the operating procedures or measures that require modification, resulting in greater control, traceability, and the like.

A second advantage is that error sensitivity is radically reduced. A third advantage is that operative personnel require access to one and only one method of handling, administering, and programming the system, regardless of function or process.

A representation of resources handled de facto by operating systems, database handlers, file systems, and other arbitrary programs include encapsulation and abstraction of interfaces to functions of the above resources and the possibility of programming operating processes by means of the method described in the aforesaid patent specification, either as separate "services" or in conjunction with service execution.

The resources (files, databases, memories, etc.) on which the functions operate are, of course, included in the abstraction, either whether it concerns functions that are based on transactions according to the above-identified patent specification with respect to behavior of the services, or whether the functions are concerned with operative administration.

According to one preferred embodiment of the invention, unique references to unique transactions are stored in one or more databases 10-12, see FIG. 1, where a number of such references define transactions for an administrative procedure, and a number of such references define transactions for an operative procedure. The references corresponding to the administrative procedure and/or to the operative procedure are transferred to one or more databases 13, 14 for transaction data by means of the all-embracing part 15 of the data system, where those transactions that correspond to transferred references are stored and activated, and where the all-embracing system 15 executes the chosen procedures by means of the transactions.

According to another preferred embodiment, the administrative part 2 of the data system initiates desired functions by fetching predetermined transactions from a database 13, 14, these transactions together forming a data program for the execution of a desired function.

According to a further preferred embodiment of the invention, the all-embracing system 15 fetches from the databases transactions related partly to different services and partly to administrative functions and executes those functions, wherein the all-embracing part 15 controls fetching of the transactions and the order in which the transactions are to be executed.

There is described below an example in which the present invention is applied to operatively handle systems that include communications services.

Given an application within the area of communications services, the operator may wish to refine the handling of user logs. By that is meant data that is saved in a file or in a database for documentation purposes, or to enable events to be traced in conjunction with a client's use of the application.

In the case of a telecommunications service, an updating requirement may mean that data are to be moved from the storage media of a user directory to a central (bulk) storage media at regular intervals, and to enable a customer service to inspect log data when necessary and to handle said data in other respects at the request of a customer or of an operator's function.

The updating could have been implemented in the following fashion according to earlier conventions:

A program intended to be run in a batch environment is created for moving and emptying user logs.

A program intended to be run interactively in a client service environment is created with the aid of client/server routines.

A method of this nature results in a number of difficulties, such as locking of user directories during batch and/or online time so as to prevent conflict in the event of a client using the application at the moment when the log is moved, for instance, communication with the application system to ensure locking, sequencing, and synchronization, and the use of retry algorithms for batch environment when a log is locked at the time of being run.

According to the present invention, the fundamental functions for achieving both 1) and 2) above in callable programs, or parts thereof, are instead implemented and represented as transactions as described above. The two programs according to 1) and 2) are then implemented as sequences of those transactions.

In FIG. 1, the reference numeral 2 identifies the administrative part of the data system 1, where the reference numeral 10 identifies a database for so-called transaction references with respect to client services, the reference numeral 11 identifies transaction references for batch programs, and the reference numeral 12 identifies transaction references for application sequences and for communications services.

The operative part 3 of the data system 1 includes a number of transactions for carrying out desired executions. Those transactions are stored in one or more databases 13, 14. Execution is effected with the aid of a computer 15 having an associated memory 16. External computers, such as a computer 17 associated with a client service can be connected to the execution computer 15. In the case of this embodiment, there is also included a log database 18 that includes a database handler, log database 18 having stored therein log data relating to the communications services. The log database 18 is connected to the transaction databases 13, 14 via an interface 19.

A batch program, in other words a program for extracting information from log data stored in a database contains functions, for instance, such as:
open log file
read log data
write log data to bulk media
remove log data
close log file Typically, such functions are programmed in some suitable language as complete functions, which are thus called.

According to the present invention, a number of transactions are used together and in a given order so as to execute the functions. The following is an exemplification of such transactions:
TRS.42 open log file
TRS.45 read log data
TRS.46 write log data to bulk media
TRS.50 remove log data
TRS.55 close log file Information as to which transactions are required for a given execution is found in the databases 10-12 in the administrative part 2, i.e., TRS.42, TRS.45, TRS.46, TRS.50 and TRS.55. Those transaction references are delivered to the databases 13, 14, where transactions in the form of program parts are stored and connected to respective transaction references.

The batch program is thus constructed of a number of mutually sequential transactions together with transactions that are already activated, such as transactions for extracting log data in respect of a given client, wherein the transaction sequence can be as follows, where only certain transactions are shown:
[ . . . ]
TRS.10 Fetch client identity
TRS.22 Verify client
TRS.31 Lock access to client data
TRS.42 Open log file
TRS.45 Read log data
[ . . . ]

In the case of a communications service application, clients are able to subscribe to different services, such as call forwarding in various stages, changed billing rules, voice mailboxes, etc.

According to one preferred embodiment of the invention, the services are stored in the form of the transaction references, which correspond to given transactions from the amount of transactions when a subscriber orders a telephone service.

It is also preferred that references are stored and tied to the subscriber number of a subscriber and that when the subscriber number is read, the all-embracing or superordinate system (15) fetches the transactions through the medium of the references and executes the transactions, thereby carrying out the service.

The computer 15 has the same interface 20, 21 against the administrative part 2 as the operative part 3. In the illustrated case, the computer 15 has received an instruction to execute log data received from the client service computer 17. The computer 15 fetches the transaction references in the databases 10-12 and transfers those references to the databases 13-14 in which the transactions are found. The computer then executes the transactions, including fetching data from the log database 18.

Because the interface between the administrative part of the data system and the all-embracing part of the data system, and the interface between the operative part of the data system and the all-embracing part of the data system, are the same, and because the all-embracing part has an execution environment such that essentially all execution in the all-embracing system and instructions from the all-embracing system to other parts of the data system is effected through the agency of the transactions, it is not necessary to fully interrupt a given operation in order to carry out another operation. Thus, a client communication service can be executed despite the fact that, for example, a client service may be analyzing statistical material in the log database at that time. Correspondingly, several tasks can be executed generally at the same time, i.e., without different program parts locking each other, even in the case of other applications of the present invention.

The present invention affords the following advantages over traditional implementation.

Directories are locked (automatically) within the application system, in the same way as that which takes place with regard to the application per se. No communication or any other arrangement is necessary.

A locking query can be placed in line in the system and then executed as soon as possible. External retry methods are unnecessary.

Moreover, the batch program and the client service application can, basically, use mutually the same transactions, and to a great extent the same sub-sequences thereof. That results in symmetrical behavior, a higher degree of reuse, and fewer error sources. Maintenance costs are also reduced considerably.

According to the present invention, the system is able to balance the load on the application, client service programs, and batch runs. As a result, batch influence on the online performance of an application is avoided.

Although the invention has been described above with reference to a number of embodiments, it will be obvious that the present invention can be implemented in respect of completely different applications and with more databases than those mentioned above, and that it can be implemented to run several different programs.

The present invention shall not therefore be considered restricted to the above-described exemplifying embodiments thereof, since variations and modifications can be made within the scope of the accompanying claims.

What is claimed is:

1. A method of operatively handling data systems that include communications services in the form of telephone and data services, said method comprising the steps of: adapting a computer data system to execute a service in accordance with a data program and to process log data, wherein said computer system includes a plurality of databases of which at least one database contains a predetermined number of transactions and in which each transaction has the form of parts of a data program; fetching transactions from said at least one database, said transactions together forming a data program for executing one of said service and said processing function; providing an interface between an administrative part of the data system and an all-embracing part of the data system, and also an interface between an operative part of the data system and the all-embracing part of the data system, wherein said interfaces are mutually the same; and wherein the all-embracing part has an executing environment such that execution in the all-embracing part and instructions from the all-embracing part to other parts of the data system takes place through the agency of said transaction.

2. A method according to claim 1, including the steps of storing unique references to unique transactions in at least one database, wherein a first number of such unique references define transactions for an administrative procedure and a second number of such unique references define transactions for an operative procedure; transferring to at least one database unique references corresponding to at least one of an administrative procedure and an operative procedure for transaction data by the all-embracing part of the data system, wherein transactions that correspond to transferred unique references are stored and activated; and executing in the all-embracing system chosen procedures through the agency of said transactions.

3. A method according to claim 1, including the step of initiating in the administrative part of the data system desired functions by fetching predetermined transactions from a database, which transactions together form a data program for executing a desired function.

4. A method according to claim 1, including the steps of fetching by use of the all-embracing part of the data system transactions from said databases partly for different services and partly for administrative functions, and executing said transactions; and controlling in the all-embracing part a collection of said transactions and the order in which said transactions are to be executed.

5. A method according to claim 2, including the step of storing in the form of said references to unique transactions corresponding to certain transactions from the number of transactions available a telephone service ordered by a subscriber.

6. A method according to claim 2, including the steps of storing said references in association with a subscriber number of a subscriber; and fetching said transactions through the agency of said references and executing said transactions to carry out a desired service when the subscriber number is read.

* * * * *